(12) United States Patent
Suyama et al.

(10) Patent No.: US 10,147,975 B2
(45) Date of Patent: Dec. 4, 2018

(54) LITHIUM ION SECONDARY BATTERY

(71) Applicant: TOYOTA JIDOSHA KABUSHIKI KAISHA, Toyota-shi, Aichi-ken (JP)

(72) Inventors: Hiroshi Suyama, Mishima (JP); Hideki Nakayama, Susono (JP); Nozomu Kobayashi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 42 days.

(21) Appl. No.: 15/417,795

(22) Filed: Jan. 27, 2017

(65) Prior Publication Data

US 2017/0279159 A1    Sep. 28, 2017

(30) Foreign Application Priority Data

Mar. 23, 2016   (JP) ................................. 2016-058565

(51) Int. Cl.
| | | |
|---|---|---|
| *H01M 10/36* | (2010.01) | |
| *H01M 4/38* | (2006.01) | |
| *H01M 4/505* | (2010.01) | |
| *H01M 4/525* | (2010.01) | |
| *H01M 4/58* | (2010.01) | |

(52) U.S. Cl.
CPC .............. *H01M 10/36* (2013.01); *H01M 4/38* (2013.01); *H01M 4/505* (2013.01); *H01M 4/525* (2013.01); *H01M 4/5825* (2013.01); *H01M 2300/0002* (2013.01)

(58) Field of Classification Search
None
See application file for complete search history.

(56) References Cited

U.S. PATENT DOCUMENTS

| | | | | |
|---|---|---|---|---|
| 6,399,245 B1* | 6/2002 | Wu | ........................ | H01M 4/244 |
| | | | | 429/206 |
| 2013/0157114 A1* | 6/2013 | Barchasz | .............. | H01M 4/483 |
| | | | | 429/160 |

OTHER PUBLICATIONS

Water-in-salt) electrolyte enables high-voltage aqueous lithium-ion chemistries. Science Magazine. vol. 350, Issue 6263, pp. 938-943, Nov. 20, 2015 (Year: 2015).*
Liumin Suo et al., Batteries, "Water-in-Salt" Electrolyte Enables High-Voltage Aqueous Lithium-Ion Chemistries, Science 350, 938 (2015), Published by American Association for the Advancement of Science, Copyright 2015, vol. 350, Issue 6265, Nov. 20, 2015, DOI: 10.1126/science.aab1595, pp. 938-943, sciencemag.org.

* cited by examiner

*Primary Examiner* — Alix E Eggerding
(74) *Attorney, Agent, or Firm* — Dickinson Wright, PLLC (57) ABSTRACT

A lithium ion secondary battery includes an aqueous electrolyte solution and has a high discharge capacity. The lithium ion secondary battery includes an anode layer including an anode active material, a cathode layer including a cathode active material, and an electrolyte solution including a solvent and an electrolyte, wherein the anode active material includes elemental sulfur, the cathode active material includes Li element, such as a Li-containing compound, the solvent includes water as a main component, the electrolyte includes lithium bis(trifluoromethanesulfonyl)imide, and the electrolyte solution includes no less than 10 mol of the lithium bis(trifluoromethanesulfonyl)imide per 1 kg of the water.

13 Claims, 5 Drawing Sheets

LITHIUM ION SECONDARY BATTERY

This application claims the benefit of Japanese Patent Application No. 2016-058565 filed Mar. 23, 2016, which is hereby incorporated by reference in its entirety.

TECHNICAL FIELD

The present disclosure relates to lithium ion secondary batteries.

BACKGROUND

Lithium ion secondary batteries provided with flammable non-aqueous electrolyte solutions and a large number of components for safety measures have a problem that the energy density per volume as a whole battery is small. Lithium ion secondary batteries provided with non-flammable aqueous electrolyte solutions that do not require the components of non-aqueous electrolyte solutions can provide a larger energy density per volume large. However, the potential windows of conventional aqueous electrolyte solutions are narrow. Therefore it has been considered difficult to obtain a high voltage from batteries having conventional aqueous electrolyte solutions.

To solve the above problem of aqueous electrolyte solutions, Non-Patent Literature 1 discloses expanding the potential window of an aqueous electrolyte solution by dissolving lithium bis(trifluoromethanesulfonyl)imide (hereinafter may be referred to as "LiTFSI") in the aqueous electrolyte solution at high concentration. In Non-Patent Literature 1, a lithium ion secondary battery is formed by the combination of such a high concentration aqueous electrolyte solution, $LiMn_2O_4$ as a cathode active material, and $Mo_6S_8$ as an anode active material.

Non-Patent Literature 1: Liumin Suo, et al., "Water-in-salt" electrolyte enables high-voltage aqueous lithium-ion chemistries, Science 350, 938 (2015)

SUMMARY OF THE DISCLOSURE

Technical Problem

The lithium ion secondary battery disclosed in Non-Patent Literature 1 has a problem of low discharge capacity. In the present application, a lithium ion secondary battery is described that includes an aqueous electrolyte solution and has a high discharge capacity.

Solution to Problem

As a result of intensive research on lithium ion secondary batteries provided with aqueous electrolyte solutions, the present inventors found the following.
(1) An aqueous electrolyte solution including LiTFSI at high concentration has a potential window on the reduction side of approximately 2.0 V (vs. Li/Li$^+$). Thus, with conventional materials used for active materials of lithium ion secondary batteries, only a battery of small discharge capacity can be made.
(2) Elemental sulfur properly functions as an anode active material in lithium ion secondary batteries having aqueous electrolyte solutions including LiTFSI at high concentrations. It was also found that a higher discharge capacity than before can be obtained when elemental sulfur is used as an anode active material in a lithium ion secondary battery having a high concentration of aqueous electrolyte solution. These findings are contrary to the general expectation by a person skilled in the art. Conventionally, there are examples in which elemental sulfur is examined as a cathode active material, whereas there is no example in which elemental sulfur is examined as an anode active material.
(3) When elemental sulfur is applied as an active material of an aqueous electrolyte solution battery, a concern is that the reaction intermediate of elemental sulfur reacts with water to have a negative effect on the electrochemical reaction. However, in the combination of an elemental sulfur anode active material and a high concentration of aqueous electrolyte solution, such negative effect is not exhibited. It is presumed this is because when elemental sulfur is used as an anode active material, the potential of the cathode is high and reactions occur with difficulty even if the reaction intermediate is eluted in the electrolyte solution and reaches the cathode. It is further believed that in a high concentration of aqueous electrolyte solution, water, which is needed for the elution of elemental sulfur, is contained in a small amount, whereby the elution itself of elemental sulfur is inhibited.
(4) Meanwhile, when elemental sulfur is used as a cathode active material, the reaction intermediate that is eluted in the electrolyte solution and reaches the anode on the lower potential side spontaneously is reduced due to the energy difference. That is, it was found that the eluted reaction intermediate product repeats oxidation and reduction between the cathode and anode, which negatively affects the electrochemical reaction of the battery.

Based on the above findings, the present disclosure is directed to the following embodiments. That is, an embodiment of the present disclosure is a lithium ion secondary battery including: an anode layer including an anode active material; a cathode layer including a cathode active material; and an electrolyte solution including a solvent and an electrolyte, wherein: the anode active material includes elemental sulfur; the cathode active material includes Li element; the solvent includes water as a main component; the electrolyte includes lithium bis(trifluoromethanesulfonyl)imide; and the electrolyte solution includes no less than 10 mol of the lithium bis(trifluoromethanesulfonyl)imide per 1 kg of the water.

In the present disclosure, an active material having a relatively low potential is referred to as "anode active material", and an active material having a relatively high potential is referred to as "cathode active material".

In the present disclosure, "electrolyte solution including a solvent and an electrolyte" means an electrolyte solution in which an electrolyte is dissolved in a solvent to be present as an anion and a cation, and exhibiting ion conductivity.

In the present disclosure, "solvent includes water as a main component" means that water accounts for no less than 50 mol % based on the total amount (100 mol %) of the solvent (liquid component) that constitutes the electrolyte solution.

In the present disclosure, "electrolyte solution including no less than 10 mol of lithium bis(trifluoromethanesulfonyl) imide per 1 kg of water" means that no less than 10 mol of LiTFSI is dissolved in 1 kg of water. That is, the electrolyte solution is constituted by water and LiTFSI dissolved in the water at high concentration.

In the lithium ion secondary battery of the present disclosure, the anode active material may include the elemental sulfur as a main component. "The anode active material includes the elemental sulfur as a main component" means that elemental sulfur accounts for no less than 50 mol %, based on the total (100 mol %) of the elemental substances and the compounds constituting the anode active material.

In the lithium ion secondary battery of the present disclosure, the electrolyte may include the lithium bis(trifluoromethanesulfonyl)imide as a main component. "Electrolyte includes lithium bis(trifluoromethanesulfonyl)imide as a main component" means that LiTFSI accounts for no less than 50 mol %, based on the total amount (100 mol %) of the electrolyte included (dissolved) in the electrolyte solution.

In the lithium ion secondary battery of the present disclosure, the cathode active material may further include Ni element and Mn element.

The lithium ion secondary battery of the present disclosure is configured to obtain a high discharge capacity by including an aqueous electrolyte solution including LiTFSI at high concentration and elemental sulfur as an anode active material.

These and other features will be apparent from the following detailed description describing various embodiments.

BRIEF DESCRIPTION OF DRAWINGS

The following is a brief description of the drawings in which.

Throughout the drawings, like reference numbers will be understood to refer to like features or structures.

DESCRIPTION OF EMBODIMENTS

The lithium ion secondary battery of the present disclosure will be described with reference to the drawings. A lithium ion secondary battery 100 (hereinafter may be referred to as "battery 100") shown in FIG. 1 includes an anode layer 10 including an anode active material 11, a cathode layer 20 including a cathode active material 21, and an electrolyte solution 30 including a solvent and an electrolyte.

Figure 1:
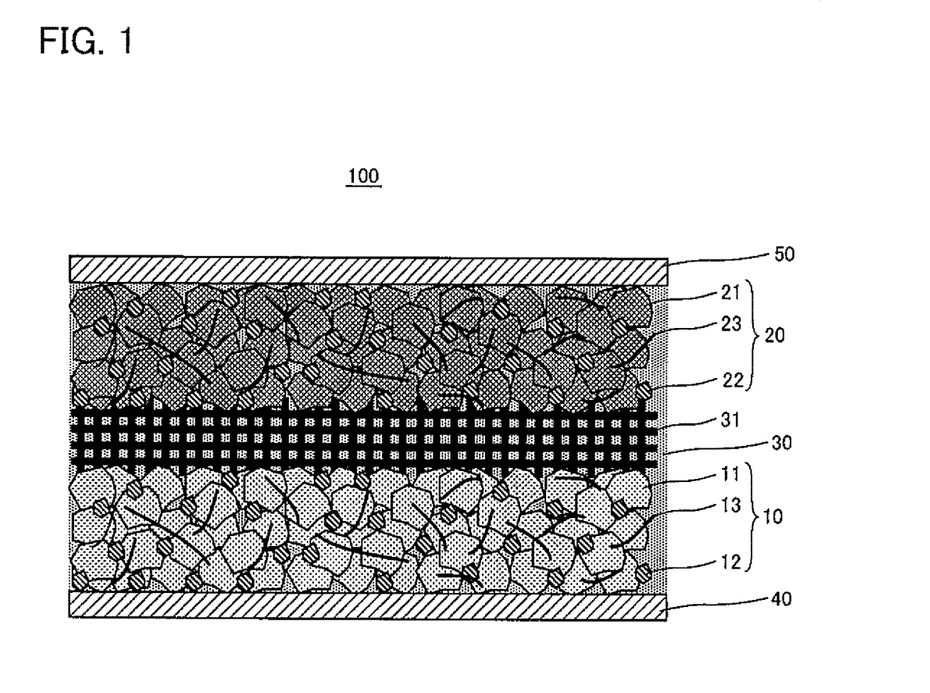
FIG. 1 is a view schematically showing the structure of a lithium ion secondary battery 100.

In the battery 100, the anode active material 11 includes elemental sulfur. The cathode active material 21 includes Li element. The solvent constituting the electrolyte solution 30 includes water as the main component. The electrolyte constituting the electrolyte solution includes LiTFSI (lithium bis(trifluoromethanesulfonyl)imide). Further, the electrolyte solution 30 includes no less than 10 mol of LiTFSI per 1 kg of the above water.

1. Anode Layer 10

The anode layer 10 includes the anode active material 11. The anode layer 10 may also include a conductive assistant 12 and a binder 13, in addition to the anode active material 11.

1.1. Anode Active Material 11

In the battery 100, one characteristic is that the anode active material 11 includes elemental sulfur. Specifically, the anode active material 11 may include elemental sulfur as its main component. That is, the elemental sulfur may account for no less than 30 mol %, may account for no less than 50 mol %, and may account for no less than 70 mol %, based on the total (100 mol %) of the elemental substances and the compounds constituting the anode active material 11. The upper limit of the percentage of the elemental sulfur in the anode active material 11 is not particularly limited.

The anode active material 11 must include elemental sulfur. The anode active material 11 may further include an anode active material other than elemental sulfur. The anode active material other than elemental sulfur may be selected with consideration of the potential window of the electrolyte solution 30. Examples of other anode active materials include lithium-transition metal composite oxides and metal sulfides such as $Mo_6S_8$. The anode active material other than elemental sulfur may account for no more than 50 mol %, may account for no more than 30 mol %, and may account for no more than 10 mol %, based on the total (100 mol %) of the elemental substances and the compounds constituting the anode active material 11.

Conventionally, elemental sulfur has been examined as a cathode active material for nonaqueous electrolyte solution lithium ion secondary batteries that include ether-based solvents. However, it has not been considered or examined as an anode active material. In addition, when elemental sulfur is applied as an active material of aqueous electrolyte solution batteries the reaction intermediate reacts with water to have a negative effect on the electrochemical reaction.

In the battery 100, elemental sulfur is used as the anode active material 11 and the electrolyte solution 30 described later is used with the elemental sulfur, which enables the elemental sulfur to properly function as an anode active material, whereby a high discharge capacity can be obtained. Regarding this, the inventors of the present disclosure presume that when elemental sulfur is used as an anode active material, the reaction occurs with difficulty even if the reaction intermediate is eluted in the electrolyte solution to reach the cathode, because the potential of the cathode is high. Thus, it is considered that the reaction intermediate does not have a negative effect on the electrochemical reaction of the battery. Also presumed is that the elution itself of elemental sulfur is inhibited, because water, which is needed for the elution of elemental sulfur, is contained in a small amount in a high concentration of an aqueous electrolyte solution.

It is noted that $Mo_6S_8$ disclosed in Non-Patent Literature 1 inserts/releases lithium ions by intercalation. Meanwhile, elemental sulfur couples/dissociates lithium ions by the complex reaction with lithium. Therefore, the battery 100 is greatly different from conventional high concentration aqueous electrolyte solution batteries in property of the anode active material.

The shape of the anode active material 11 is not particularly limited. For example, it may be particulate. When the anode active material 11 is formed as particles, the primary particle diameter may be in the range of from 1 nm to 100 µm. The lower limit may be no less than 10 nm, may be no less than 50 nm, and may be no less than 100 nm. The upper limit may be no more than 30 µm, and may be no more than 10 µm. The anode active material 11 may form a secondary particle in which the primary particles are gathered or agglomerated. In this case, the particle diameter of the secondary particle is not particularly limited, and normally in the range of from 0.5 µm to 100 µm. The lower limit may be no less than 1 μm, and the upper limit may be no more than 20 μm. With the anode active material 11 having such a range of particle diameters, it is possible to obtain the anode layer 10 having excellent ion conductivity and electron conductivity.

The amount of the anode active material 11 included in the anode layer 10 is not particularly limited. For example, based on the entirety of the anode layer 10 (100 mass %), the anode active material 11 may be included by no less than 10 mass %, may be included by no less than 20 mass %, and may be included by no less than 40 mass %. The upper limit is not particularly limited, and may be no more than 99 mass %, may be no more than 95 mass %, and may be no more than 90 mass %. With the anode active material 11 having such a range of content, it is possible to obtain the anode layer 10 having excellent ion conductivity and electron conductivity.

1.2. Optional Component of Anode Layer 10

The anode layer 10 may include the conductive assistant 12 and the binder 13, in addition to the anode active material 11.

For the conductive assistant 12, any conductive assistant used in lithium ion secondary batteries may be applied. Specifically, conductive assistants including a carbon material selected from Ketjen Black (KB), vapor-grown carbon fiber (VGCF), acetylene black (AB), carbon nanotube (CNT), and carbon nanofiber (CNF) may be applied. Metal materials that can endure the environment during use of the battery may also be used. For the conductive assistant 12, one kind may be used alone, or a mixture of two or more kinds may also be used. For the shape of the conductive assistant 12, various shapes, such as particulate and fibrous, may be applied. The amount of the conductive assistant 12 included in the anode layer 10 is not particularly limited. For example, based on the entirety of the anode layer 10 (100 mass %), the conductive assistant 12 may be included by no less than 10 mass %, may be included by no less than 30 mass %, and may be included by no less than 50 mass %. The upper limit is not particularly limited, and may be no more than 90 mass %, may be no more than 70 mass %, and may be no more than 50 mass %. With the conductive assistant 12 having such a range of content, it is possible to obtain the anode layer 10 having excellent ion conductivity and electron conductivity.

For the binder 13, any binder used in lithium ion secondary batteries may be applied. Examples thereof include styrene-butadiene rubber (SBR), carboxymethyl cellulose (CMC), acrylonitrile butadiene rubber (ABR), butadiene rubber (BR), polyvinylidene fluoride (PVDF), and polytetrafluoroethylene (PTFE). For the binder 13, one kind may be used alone, or a mixture of two or more kinds may also be used. The amount of the binder 13 included in the anode layer 10 is not particularly limited. For example, based on the entirety of the anode layer 10 (100 mass %), the binder 13 may be included by no less than 1 mass %, may be included by no less than 3 mass %, and may be included by no less than 5 mass %. The upper limit is not particularly limited, and may be no more than 90 mass %, may be no more than 70 mass %, and may be no more than 50 mass %. With the binder 13 having such a range of content, it is possible to properly bond the anode active material 11 and the like and to obtain the anode layer 10 having excellent ion conductivity and electron conductivity.

The thickness of the anode layer 10 is not particularly limited, and for example may be in the range of from 0.1 μm to 1 mm, and may be in the range of from 1 μm to 100 μm.

2. Cathode Layer 20

The cathode layer 20 includes the cathode active material 21. The cathode layer 20 may include a conductive assistant 22 and a binder 23, in addition to the cathode active material 21.

2.1. Cathode Active Material 21

The cathode active material 21 includes Li element, and can release/occlude lithium ions. The Li can be included as a Li-containing compound that is able to release/occlude Li ions. The Li-containing compound can be in the form of a metal oxide or metal phosphate and can include at least one other metal, such as for example, Co, Ni, Mn and Ti. Needless to say, the potential of the cathode active material 21 is higher than that of the anode active material 11, and the cathode active material 21 is adequately selected with consideration of the potential window of the electrolyte solution 30 described later. For example, oxides and polyanions including Li element may be selected. More specifically, lithium cobalt oxide ($LiCoO_2$); lithium nickel oxide ($LiNiO_2$); lithium manganese oxide ($LiMn_2O_4$); $LiNi_{1/3}Mn_{1/3}Co_{1/3}O_2$; different kind element substituent Li—Mn spinels represented by $Li_{1+x}Mn_{2-x-y}M_yO_4$ (M is one or more kind selected from Al, Mg, Co, Fe, Ni and Zn); lithium titanium oxide ($Li_xTiO_y$); lithium metal phosphate ($LiMPO_4$, M is one or more kind selected from Fe, Mn, Co and Ni); and the like may be used. Specifically, cathode active materials including Ni element and Mn element in addition to Li element may be used, and cathode active materials having a spinel structure represented by $Li_{1+x}Mn_{2-x-y}Ni_yO_4$ may be used. As used herein, the Ni element and Mn element refer to Ni-containing metal compounds and Mn-containing compounds, respectively, such as an oxide or phosphate. In one embodiment, the Li, Ni and/or Mn are in the form of a multi-metallic metal oxide or phosphate. The electrolyte solution 30 described later has an oxidation potential of potential window of approximately 5.0 V (vs. Li/Li$^+$) or more, with which a high potential cathode active material including Ni element and Mn element in addition to Li element may be used. For the cathode active material 21, one kind may be used alone, or a mixture of two or more kinds may also be used.

The shape of the cathode active material 21 is not particularly limited. For example, it may be particulate. When the cathode active material 21 is formed as particles, the primary particle diameter may be in the range of from 1 nm to 100 μm. The lower limit may be no less than 5 nm, may be no less than 10 nm, and may be no less than 50 nm. The upper limit may be no more than 30 μm, and may be no more than 10 μm. It is noted that the cathode active material 21 may form a secondary particle in which the primary particles are gathered. In this case, the particle diameter of the secondary particle is not particularly limited, and normally in the range of from 0.5 μm to 50 μm. The lower limit may be no less than 1 μm. The upper limit may be no more than 20 μm. With the cathode active material 21 having such a range of particle diameters, it is possible to obtain the cathode layer 20 having excellent ion conductivity and electron conductivity.

The amount of the cathode active material 21 included in the cathode layer 20 is not particularly limited. For example, based on the entirety of the cathode layer 20 (100 mass %), the cathode active material 21 may be included by no less than 10 mass %, may be included by no less than 20 mass %, and may be include by no less than 40 mass %. The upper limit is not particularly limited, and may be no more than 99 mass %, may be no more than 97 mass %, and may be no more than 95 mass %. With the cathode active material 21 having such a range of content, it is possible to obtain the cathode layer 20 having excellent ion conductivity and electron conductivity.

2.2. Optional Component of Cathode Layer 20

The cathode layer 20 may include the conductive assistant 22 and the binder 23 in addition to the cathode active material 21. The kinds of the conductive assistant 22 and the binder 23 are not particularly limited, and may be selected from the examples of the above-described conductive assistant 12 and the binder 13. The amount of the conductive assistant 22 included in the cathode layer 20 is not particularly limited. For example, based on the entirety of the cathode layer 20 (100 mass %), the conductive assistant 22 may be included by no less than 0.1 mass %, may be included by no less than 0.5 mass %, and may be included by no less than 1 mass %. The upper limit is not particularly limited, and may be no more than 50 mass %, may be no more than 30 mass %, and may be no more than 10 mass %. The amount of the binder 23 included in the cathode layer 20 is not particularly limited either. For example, based on the entirety of the cathode layer 20 (100 mass %), the binder 23 may be included by no less than 0.1 mass %, may be included no less than 0.5 mass %, and may be included no less than 1 mass %. The upper limit is not particularly limited, and may be no more than 50 mass %, may be no more than 30 mass %, and may be no more than 10 mass %. With the conductive assistant 22 and the binder 23 having such a range of content, it is possible to obtain the cathode layer 20 having excellent ion conductivity and electron conductivity.

The thickness of the cathode layer 20 is not particularly limited, and for example it may be in the range of from 0.1 μm to 1 mm, and may be in the range of from 1 μm to 100 μm.

3. Electrolyte Solution 30

In an electrolyte solution-based lithium ion secondary battery, an electrolyte solution exists in the anode layer and cathode layer, and between the anode layer and cathode layer, which secures the lithium ion conductivity between the anode layer and cathode layer. The battery 100 also takes this structure. Specifically, in the battery 100, a separator 31 is provided between the anode layer 10 and the cathode layer 20. The separator 31, the anode layer 10 and the cathode layer 20 are immersed in the electrolyte solution 30.

The electrolyte solution 30 includes a solvent and an electrolyte. One characteristic of the battery 100 is that the solvent of the electrolyte solution 30 includes water as the main component, the electrolyte of the electrolyte solution 30 includes LiTFSI, and the electrolyte solution 30 includes no less than 10 mol of LiTFSI per 1 kg of the water.

3.1. Solvent

The solvent includes water as the main component. That is, based on the total amount of the solvent (liquid component) of the electrolyte solution (100 mol %), water may account for no less than 50 mol %, may account for no less than 70 mol %, and may account for no less than 90 mol %. The upper limit of the percentage of water in the solvent is not particularly limited.

The solvent includes water as the main component, and may also include a solvent other than water, in view of forming a SEI (Solid Electrolyte Interphase) on the surface of the active material for example. Examples of the solvent other than water include one or more kind selected from ethers, carbonates, nitriles, alcohols, ketones, amines, amides, sulfur compounds and hydrocarbons. Based on the total amount of the solvent (liquid component) of the electrolyte solution (100 mol %), the solvent other than water may account for no more than 50 mol %, may account for no more than 30 mol %, and may account for no more than 10 mol %.

3.2. Electrolyte

The electrolyte includes LiTFSI. Specifically, the electrolyte may include LiTFSI as the main component. That is, based on the total amount of the electrolyte included (dissolved) in the electrolyte solution (100 mol %), LiTFSI may account for no less than 50 mol %, may account for no less than 70 mol %, and may account for no less than 90 mol %.

The electrolyte solution 30 includes no less than 10 mol of LiTFSI per 1 kg of the above water. It may be no less than 15 mol, and may be no less than 20 mol. The upper limit is not particularly limited, and may be no more than 25 mol for example. In the electrolyte solution 30, by including no less than 10 mol of LiTFSI per 1 kg of the above water, the potential on the reduction side of the potential window of the electrolyte solution 30 become small, to be approximately 2.0 V (vs. Li/Li$^+$) or less. If the potential on the reduction side of the potential window of the electrolyte solution 30 is approximately 2.0 V (vs. Li/Li$^+$) or less, decomposition of the electrolyte solution and the like do not occur easily, even when elemental sulfur is used as the anode active material 11.

The electrolyte solution may further include an electrolyte other than LiTFSI. Examples of the electrolyte other than LiTFSI include: imide-based electrolytes such as lithium bis(fluorosulfonyl)imide; LiPF$_6$; LiBF$_4$; Li$_2$SO$_4$; and LiNO$_3$. The electrolyte other than LiTFSI may account for no more than 50 mol %, may account for no more than 30 mol %, and may account for no more than 10 mol %, based on the total amount of the electrolyte included (dissolved) in the electrolyte solution (100 mol %).

3.3. Optional Component of Electrolyte Solution 30

The electrolyte solution 30 may include another component, in addition to the above-described solvent and electrolyte. For example, alkali metal and alkaline earth metal other than lithium and the like may be added as cation, as another component. However, considering the potential window of the electrolyte solution 30, the amount of another component may be small.

3.4. Separator 31

In the battery 100, the separator 31 is provided between the anode layer 10 and the cathode layer 20. For the separator 31, any separator used in conventional aqueous electrolyte solution batteries may be used. For example, hydrophilic separators such as nonwoven fabric made of cellulose may be used. The thickness of the separator 31 is not particularly limited, and may be in the range of from 5 μm to 1 mm, for example.

4. Other Battery Structure

In the battery 100, the anode layer 10 is connected to an anode current collector 40 and the cathode layer 20 is connected to a cathode current collector 50. From the current collectors, electrical energy is taken out via terminals and the like (not shown). For the anode current collector 40 and the cathode current collector 50, a known metal that can be used as current collectors of lithium ion secondary batteries may be used. Examples of such metals include a metal material that includes one or two or more elements selected from the group consisting of Cu, Ni, Al, V, Au, Pt, Mg, Fe, Ti, Co, Cr, Zn, Ge and In. The form of the anode current collector 40 and the cathode current collector 50 is not particularly limited, and various forms, such as foil and mesh, may be used.

5. Manufacturing Method

The battery 100 described above may be manufactured with application of a known method. For example, it may be manufactured as follows. However, the manufacturing method of the battery 100 is not limited to the following method.

(1) Dispersing the anode active material etc. that constitute the anode layer 10 into a solvent, to obtain an anode mixture paste. The solvent used here is not particularly limited, and water and various organic solvents may be used. The anode mixture paste is then applied on a surface of the anode current collector 40, for example by a doctor blade, and dried, to form the anode layer 30 on the surface of the anode current collector 40, whereby, an anode electrode body is obtained.

(2) Dispersing the cathode active material etc. that constitute the cathode layer 20 into a solvent, to obtain a cathode mixture paste. The solvent used here is not particularly limited, and water and various organic solvents may be used. The cathode mixture paste is then applied on a surface of the cathode current collector 50, for example by a doctor blade, and dried, to form the cathode layer 20 on the surface of the cathode current collector 50, whereby, a cathode electrode body is obtained.

(3) Sandwiching the separator 31 between the anode electrode body and the cathode electrode body, to obtain a stack including the anode current collector 40, the anode layer 10, the separator 31, the cathode layer 20 and the cathode current collector 50 in the order mentioned.

(4) Housing the stack in a battery case, and the filling inside the battery case with the electrolyte solution 30. The stack and the electrolyte solution are sealed in the battery case in a manner that the stack is immersed in the electrolyte solution 30, whereby, the battery 100 is obtained.

As described above, by using the aqueous electrolyte solution 30 including LiTFSI at high concentration and elemental sulfur as the anode active material 11, the lithium ion secondary battery 100 having a high discharge capacity can be obtained.

EXAMPLES

Example 1

(Manufacture of Anode Electrode Body)

Elemental sulfur (purity 99.99%, manufactured by Kojundo Chemical Laboratory Co., Ltd.) as an anode active material and Ketjen black (manufactured by Lion Specialty Chemicals Co., Ltd.) as a conductive assistant were weighed such that their mass ratio was 1:1, and put in a ball mill pot (material: zirconium) with one hundred sixty balls ($\varphi$ 5 mm, material: zirconium). The pot was sealed and installed on a rotating table of a planetary ball mill (Planetary mill P-7, manufactured by Fritsch). The contents of the pot were mixed for 5 hours at a rotational speed of 370 rpm whereby, a mixture was obtained.

The obtained mixture, and styrene-butadiene rubber (SBR, manufactured by ZEON CORPORATION) and carboxymethylcellulose (CMC, manufactured by Daicel Corporation) as binders were weighed such that their mass ratio was mixture:SBR:CMC=90:5:5, and mixed with water, whereby an anode mixture slurry was obtained. The mixing was carried out by a mixing apparatus (THINKY MIXER, manufactured by Thinky Corporation), under the mixing conditions of 2000 rpm for 10 minutes. When the mixing was carried out, the viscosity of the slurry was visually observed, and adjusted by adequately adding water, such that the coating was easily carried out.

The obtained anode mixture slurry was applied on an anode current collector of aluminum foil by a blade (blade thickness 75 μm), thereafter dried at 60° C., to form an anode layer on the aluminum foil whereby, an anode electrode body was obtained.

(Manufacture of Cathode Electrode Body)

NiMn spinel ($LiNi_{0.5}Mn_{1.5}O_4$) as a cathode active material, acetylene black (HS-100) as a conductive assistant, and polyvinylidene fluoride (PVdF) as a binder were weighed such that their mass ratio was NiMn spinel:acetylene black:PVdF=89:8:3, and mixed with N-methylpyrrolidone (NMP), whereby a cathode mixture slurry was obtained. The mixing was carried out by a mixing apparatus (THINKY MIXER, manufactured by Thinky Corporation), under the mixing conditions of 2000 rpm for 10 minutes. When the mixing was carried out, the viscosity of the slurry was visually observed, and adjusted by adequately adding NMP, such that the coating was easily carried out.

The obtained cathode mixture slurry was applied on a cathode current collector of aluminum foil by a blade (blade thickness 150 μm), thereafter dried at 60° C., to form a cathode layer on the aluminum foil whereby, a cathode electrode body was obtained.

(Manufacture of Electrolyte Solution)

Water and LiTFSI (manufactured by Kishida Chemical Co., Ltd.) were weighed and mixed. The mixture was put in a thermostatic bath, adjusted to 40° C. to promote the dissolution, and allowed to stand for one night, whereby an aqueous electrolyte solution was adjusted. In this Example, in the aqueous electrolyte solution, 21 mol of LiTFSI was dissolved per 1 kg of water.

(Manufacture of Lithium Ion Secondary Battery)

The anode electrode body and the cathode electrode body were each cut out into $\varphi$ 16 mm in size. Thereafter, a cellulose-based nonwoven fabric (HF5215, manufactured by Mitsubishi Paper Mills Limited) was sandwiched by the anode electrode body and the cathode electrode body as a separator, to obtain a stack. The stack was housed in a coin-shaped battery case and the inside of the case was filled with the electrolyte solution. The case was sealed, whereby a lithium ion secondary battery according to Example 1 was obtained.

Example 2

(Manufacture of Anode Electrode Body)

An anode electrode body was manufactured in the same way as in Example 1.

(Manufacture of Cathode Electrode Body)

A cathode electrode body was manufactured in the same way as in Example 1, except that a ternary cathode active material ($LiNiMnCoO_2$) was used as a cathode active material instead of NiMn spinel, and the mass ratio of the cathode active material, acetylene black and PVdF was changed to cathode active material:acetylene black:PVdF=85:10:5.

(Manufacture of Electrolyte Solution)

An aqueous electrolyte solution was manufactured in the same way as in Example 1.

(Manufacture of Lithium Ion Secondary Battery)

A lithium ion secondary battery according to Example 2 was obtained in the same way as in Example 1, except that the above-described cathode electrode body according to Example 2 was used.

Figure 2:
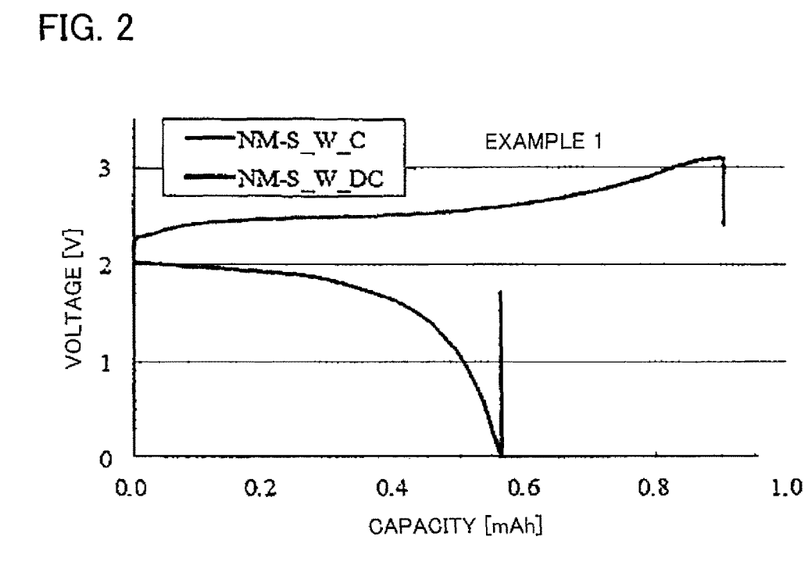
FIG. 2 is a view showing a charge-discharge curve of a lithium ion secondary battery according to Example 1.
Figure 3:
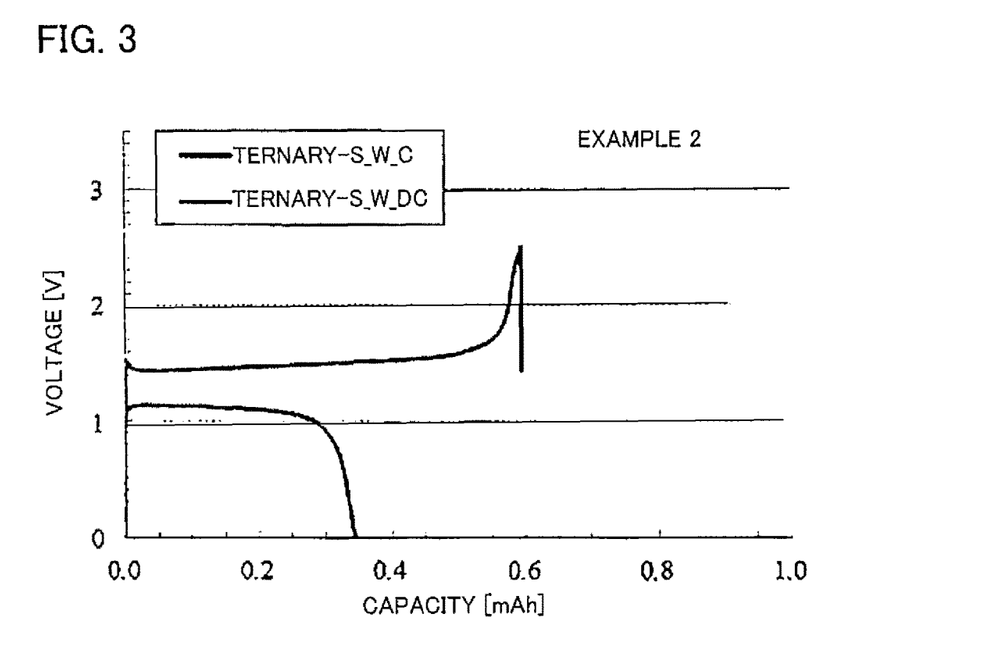
FIG. 3 is a view showing a charge-discharge curve of a lithium ion secondary battery according to Example 2.
Figure 4:
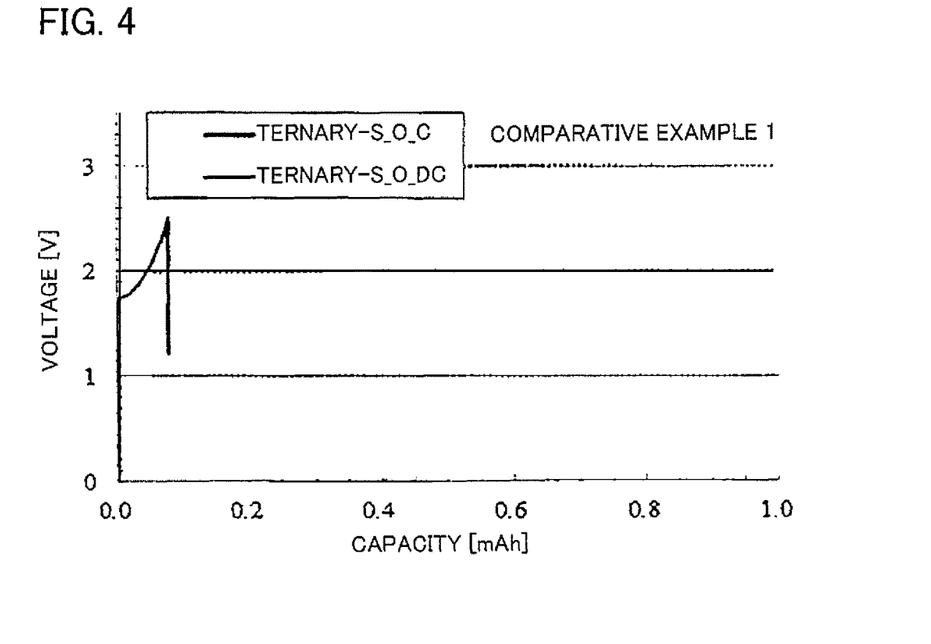
FIG. 4 is a view showing a charge-discharge curve of a lithium ion secondary battery according to Comparative Example.

Comparative Example (Manufacture of Anode Electrode Body)
An anode electrode body was manufactured in the same way as in Example 1.
(Manufacture of Cathode Electrode Body)
A ternary cathode electrode body was manufactured in the same way as in Example 2.
(Manufacture of Electrolyte Solution)
A non-aqueous electrolyte solution (DST3, manufactured by Mitsubishi Chemical Corporation) in which 1M $LiPF_6$ was added in a solvent mixture of ethylene carbonate, dimethyl carbonate, and ethyl methyl carbonate was used.
(Manufacture of Lithium Ion Secondary Battery)
A lithium ion secondary battery according to Comparative Example was obtained in the same way as in Example 1, except that the above-described non-aqueous electrolyte solution was used.
<Evaluation Method>
By means of the following apparatuses, the charge-discharge characteristics of the lithium ion secondary batteries according to Examples 1 and 2 and Comparative Example 1 were evaluated under the following conditions. The results are shown in FIGS. 2 to 4.
(Apparatuses)
Charge-discharge apparatus: VMP3 manufactured by Bio-Logic Science Instruments
Thermostatic bath: LU-124 manufactured by ESPEC CORP.
(Conditions)
5 mA CC charge-discharge
Cut voltage: Example 1: 3.05 V-0 V
Example 2 and Comparative Example: 2.5 V-1 V FIG. 2 shows the charge-discharge curve of the lithium ion secondary battery according to Example 1. As shown in FIG. 2, the plateau of charge was confirmed at around 2.5 V, and the plateau of discharge was confirmed at around 2 V. The charge capacity was approximately 0.9 mAh, and the discharge capacity was approximately 0.56 mAh. Therefore, the coulombic efficiency at the first charge-discharge was approximately 62%.

FIG. 3 shows the charge-discharge curve of the lithium ion secondary battery according to Example 2. As shown in FIG. 3, the plateau of charge was confirmed at around 1.5 V, and the plateau of discharge was confirmed at around 1.1 V. The charge capacity was approximately 0.6 mAh, and the discharge capacity was approximately 0.35 mAh. Therefore, the coulombic efficiency at the first charge-discharge was approximately 58%.

FIG. 4 shows the charge-discharge curve of the lithium ion secondary battery according to the Comparative Example. As shown in FIG. 4, the lithium ion battery according to Comparative Example showed little charge-discharge reaction.

From the above results, it was confirmed that an aqueous electrolyte solution including LiTFSI at high concentration was active to the reactivity of active material of elemental sulfur. When elemental sulfur was applied as an active material of an aqueous electrolyte solution battery, a concern was that the reaction intermediate of elemental sulfur could react with water to have a negative effect on the electrochemical reaction. However, in the lithium ion secondary batteries according to Examples 1 and 2, such negative effect was not confirmed. It is considered this is because of the following mechanism. It is presumed that when elemental sulfur is used as an anode active material, the reaction is occurs with difficultly even if the reaction intermediate is eluted in the electrolyte solution and reaches the cathode, because the potential of the cathode is high. Alternatively, it is presumed that in a high concentration of aqueous electrolyte solution, water, which is needed for the elution of elemental sulfur, is contained in a small amount, whereby it was possible to inhibit the elution itself of elemental sulfur.

Figure 5:
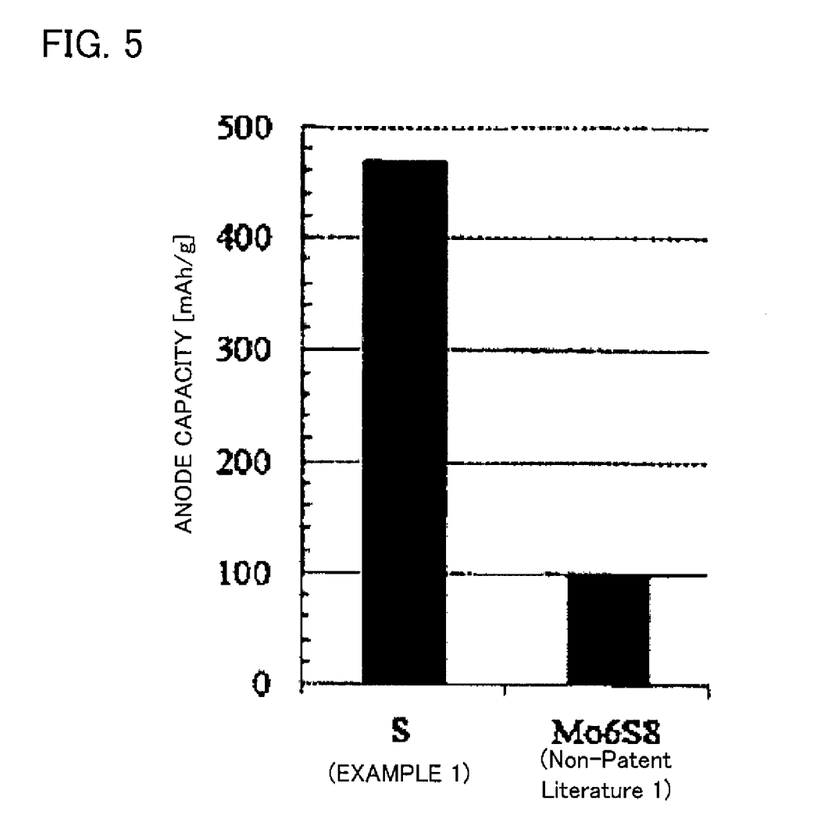
FIG. 5 is a graph to compare the discharge capacity of the lithium ion secondary battery according to Example 1 and the discharge capacity of the battery disclosed in Non-Patent Literature 1.

FIG. 5 shows a graph to compare the discharge capacity (anode capacity) of the lithium ion secondary battery according to Example 1 and the discharge capacity (anode capacity) of the battery disclosed in Non-Patent Literature 1. As shown in FIG. 5, the lithium ion secondary battery according to Example 1 had a capacity approximately five times larger than that of the battery disclosed in Non-Patent Literature 1, which was a high capacity of approximately 470 mAh/g.

Considering the above-described mechanism, it is considered that various materials other than the above NiMn spinel and ternary cathode active material may also be used as the cathode active material. That is, as long as the potential of the cathode active material is higher than that of the anode active material, it is possible to prevent the eluted material from reacting with the cathode, even if the reaction intermediate of elemental sulfur is eluted from the anode into the electrolyte solution and reaches the cathode. Therefore, materials that function as a cathode active material of lithium ion secondary batteries (e.g. material including Li element) may be used as the cathode active material without particular limitations.

In addition, regarding the potential window of the aqueous electrolyte solution, it is considered that elemental sulfur may properly function as an anode active material without decomposing the electrolyte solution, as long as the potential on the reduction side is no more than 2.0 V (vs. $Li/Li^+$). That is, from the Non-Patent Literature 1, it can be said that the aqueous electrolyte solution only has to include no less than 10 mol of LiTFSI per 1 kg of water in concentration.

INDUSTRIAL APPLICABILITY

The lithium ion secondary battery according to the present disclosure has a high discharge capacity, and may be applied for example as a large-size power source for vehicle mounting.

The examples described above are examples of the lithium ion secondary battery and are not intended to limit the scope of the embodiments. Other embodiments can be made without departing from the scope of the disclosure.

DESCRIPTION OF REFERENCE NUMERALS

10 anode layer
11 anode active material
12 conductive assistant
13 binder
20 cathode layer
21 cathode active material
22 conductive assistant
23 binder
30 electrolyte solution
31 separator
40 anode current collector
50 cathode current collector
100 lithium ion secondary battery

The invention claimed is:
1. A lithium ion secondary battery comprising:
an anode layer including an anode active material;
a cathode layer including a cathode active material; and an electrolyte solution including a solvent and an electrolyte, wherein:

the anode active material includes elemental sulfur;

the cathode active material includes Li;

the solvent includes water;

the electrolyte includes lithium bis(trifluoromethanesulfonyl)imide; and the electrolyte solution includes no less than 10 mol of the lithium bis(trifluoromethanesulfonyl)imide per 1 kg of the water in the electrolyte solution.

2. The lithium ion secondary battery according to claim 1, wherein the anode active material includes the elemental sulfur in an amount not less than 30% by weight based on the total weight of the anode active material.

3. The lithium ion secondary battery according to claim 1, wherein the electrolyte includes the lithium bis(trifluoromethanesulfonyl)imide in an amount not less than 50 mol % based on the total amount of the electrolyte.

4. The lithium ion secondary battery according to claim 2, wherein the electrolyte includes the lithium bis(trifluoromethanesulfonyl)imide in an amount not less than 50 mol % based on the total amount of the electolyte.

5. The lithium ion secondary battery according to claim 1, wherein the cathode active material further includes Ni and Mn.

6. The lithium ion secondary battery according to claim 2, wherein the cathode active material further includes Ni and Mn.

7. The lithium ion secondary battery according to claim 3, wherein the cathode active material further includes Ni and Mn.

8. The lithium ion secondary battery according to claim 4, wherein the cathode active material further includes Ni and Mn.

9. The lithium ion secondary battery according to claim 1, wherein the cathode active material is a Li-containing compound.

10. The lithium ion secondary battery according to claim 1, wherein the Li in the cathode active material is a Li-containing compound including Ni and Mn.

11. The lithium ion secondary battery according to claim 1, wherein the cathode active material includes a Li-containing compound including at least one selected from the group consisting of Co, Ni, Mn and Ti.

12. The lithium ion secondary battery according to claim 1, wherein the Li in the cathode active material is in the form of a Li oxide or Li phosphate.

13. The lithium ion secondary battery according to claim 12, wherein the Li oxide or Li phosphate further include at least one selected from the group consisting of Co, Ni, Mn and Ti.

\* \* \* \* \*